United States Patent [19]

Lee

[11] Patent Number: 5,376,775
[45] Date of Patent: Dec. 27, 1994

[54] HIGH FREQUENCY INDUCTION HEATING APPLIANCE

[75] Inventor: Min K. Lee, Kyungsangnam-do, Rep. of Korea

[73] Assignee: Goldstar Co., Ltd., Seoul, Rep. of Korea

[21] Appl. No.: 962,861

[22] Filed: Oct. 19, 1992

[30] Foreign Application Priority Data

Oct. 24, 1991 [KR] Rep. of Korea ............... 18744/1991

[51] Int. Cl.$^5$ .............................................. H05B 6/08
[52] U.S. Cl. ..................................... 219/665; 219/626; 219/664
[58] Field of Search .............. 219/10.77, 10.493, 663, 219/665, 664, 667, 626, 627, 625; 363/97, 21

[56] References Cited

U.S. PATENT DOCUMENTS

| | | | |
|---|---|---|---|
| 4,686,340 | 8/1987 | Fukasawa | 219/664 |
| 4,764,652 | 8/1988 | Lee | 219/627 |
| 4,810,847 | 3/1989 | Ito | 219/626 |
| 4,820,891 | 4/1989 | Tanaka et al. | 219/626 |
| 5,099,379 | 3/1992 | Lee | 219/627 X |
| 5,111,014 | 5/1992 | Tanaka et al. | 219/626 |

*Primary Examiner*—Philip H. Leung

[57] ABSTRACT

A high frequency induction heating appliance comprising a working coil for generating a high frequency signal, a switching device for switching a drive voltage to the working coil, a low voltage transformer for lowering an AC power voltage, an input current detector for detecting current of the AC power, an output adjusting device for providing an output adjusting signal, a differential amplifier for amplifying a difference between output signals from the input current detector and output adjusting device, a first comparator for comparing the output signal from the input current detector with a reference voltage, an integrator for integrating an output signal from the differential amplifier, a start signal generating circuit, a zero crossing detecting circuit, a delay circuit for delaying a zero crossing detect signal by a time period, an AND logic operating circuit for AND logic-operating a start signal and the delayed zero crossing detect signal, a synchronizing signal generator, a reference signal generator, a second comparator for comparing an output signal from the AND logic operating circuit with a reference signal or comparing an output signal from the integrator with the reference signal, and a drive controller for controlling the operation of the switching device in response to an output signal from the second comparator.

21 Claims, 6 Drawing Sheets

F I G. 4
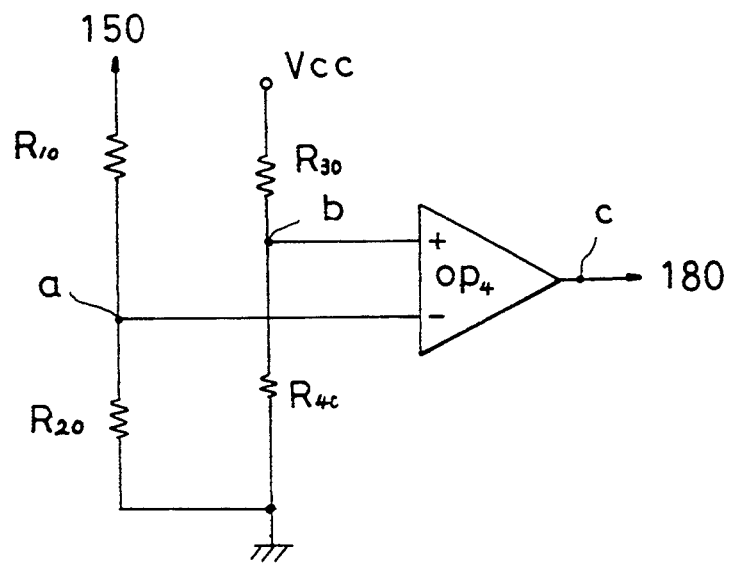
F I G. 5
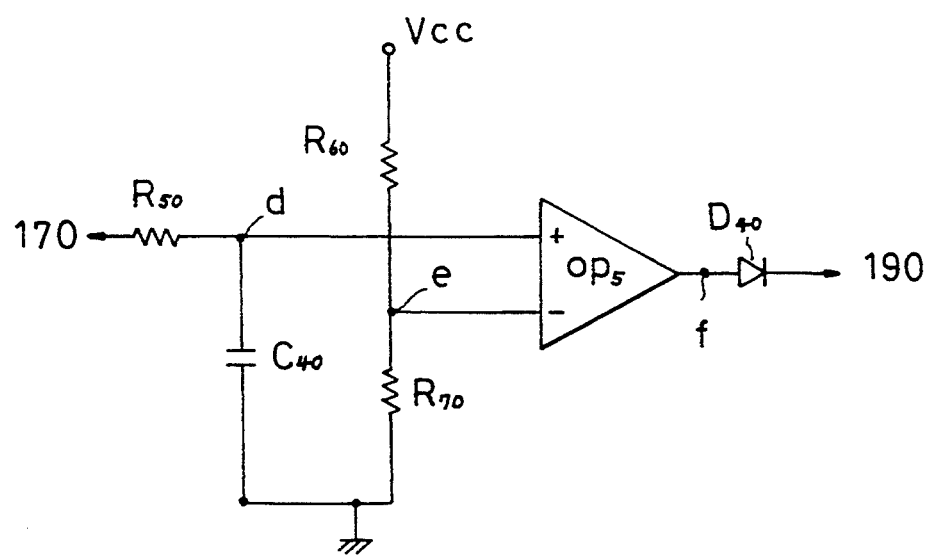

HIGH FREQUENCY INDUCTION HEATING APPLIANCE

BACKGROUND OF THE INVENTION

1. Field of the Invention

The present invention relates in general to high frequency induction heating appliances, and more particularly to a high frequency induction heating appliance for sensing accurately the amount of load, such as a size of a container to be heated.

2. Description of the Prior Art

Referring to FIG. 1, there is shown a block diagram of a conventional high frequency induction heating appliance. As shown in this figure, the conventional appliance comprises an alternating current (AC) power supply 1, a bridge diode 2 for full-wave rectifying a commercial AC power (for example, 110 V or 220 V) from the AC power supply 1, a smoothing circuit 3 for smoothing the full-wave rectified direct current (PC) voltage from the bridge diode 2, a working coil 4 being driven by the smoothed DC voltage from the smoothing circuit 3 being applied as a drive voltage thereto to generate a high frequency induction heating signal, a resonance condenser C3 connected between both sides of the working coil 4, a NPN type bipolar transistor Q1 connected between the working coil 4 and the ground for switching the smoothed DC voltage from the smoothing circuit 3 being applied as the drive voltage to the working coil 4, a current transformer 5 connected to the AC power supply 1 for detecting current of the AC power supply 1, a voltage generator 6 for generating a voltage corresponding to the detected current from the current transformer 5, an output adjusting device 7 for providing a signal for adjusting output of the appliance under adjustment of the user, and an operational amplifier 8 for amplifying a difference between an output signal from the voltage generator 6 inputted at its inverting input terminal (−) and an output signet from the output adjusting device 7 inputted at its non-inverting input terminal (+).

The conventional high frequency induction heating appliance also comprises a first comparator 9 for comparing the output signal from the voltage generator 6 inputted at its inverting input terminal (−) with a predetermined reference voltage from a reference voltage generator 9a inputted at its non-inverting input terminal (+), an integrator 10 being disabled or enabled by an output signal from the first comparator 9 to integrate an output signal from the operational amplifier 8 upon being enabled, a start signal generating circuit 11 being disabled or enabled in the opposite manner to the integrator 10 by the output signal from the first comparator 9 to generate a start signal for starting the operation of the appliance upon being enabled, a diode D1 for blocking a minus voltage of an output signal from the integrator 10, a diode D2 for blocking a minus voltage of an output signal from the start signal generating circuit 11, a synchronizing signal generator 12 for generating a synchronizing signal corresponding to the driven state of the working coil 4, a reference signal generator 13 for generating a saw tooth wave signal as in reference signal whenever the synchronizing signal is generated from the synchronizing signal generator 12, a second comparator 14 for comparing an output signal from the diode D1 or an output signal from the diode D2 inputted at its non-inverting input terminal (+) with the saw tooth wave signal from the reference signal generator 13 inputted at its inverting input terminal (−), and a drive controller 15 for controlling turning on/off of the NPN type bipolar transistor Q1 in response to an output signal from the second comparator 14.

Now, the operation of the conventional high frequency induction heating appliance with the above-mentioned construction will be described.

First, the high frequency induction heating appliance is applied with the commercial AC power (110 V/220 V) and the output adjusting device 7 therein generates the output adjusting signal under the adjustment of the user. Since the current inputted at the voltage generator 6 through the current transformer 5 is zero at the initial state in which the power is applied to the appliance, the operational amplifier 8 amplifies only the output adjusting signal from the output adjusting device 7. At the same time, the first comparator 9 outputs a high signal because its inverting input terminal is applied with the zero voltage from the voltage generator 6 and its non-inverting input is applied with a voltage from reference voltage generator 9a. The high signal from the first comparator 9 is applied as an enable signal to the start signal generating circuit 11 and as a disable signal to the integrator 10. As a result, the integrator 10 performs no integration of the output signal from the operational amplifier 8 and the start signal generating circuit 11 outputs the start signal for starting the operation of the high frequency induction heating appliance. The start signal from the start signal generating Circuit 11 is applied through the diode D2 to the non-inverting input terminal (+) of the second comparator 14.

On the other hand, the synchronous signal generator 12 is connected between both the sides of the working coil 4 to generate a synchronizing signal corresponding to a variation of the drive voltage being applied to the working coil 4. The drive voltage to the working coil 4 is varied according to the switching (turning-on/off) of the NPN type bipolar transistor Q1.

The reference signal generator 13 generates a saw tooth wave signal as the reference signal whenever the synchronizing signal is generated from the synchronizing signal generator 12. The generated saw tooth wave signal is applied to the inverting input terminal (−) of the second comparator 14. At the initial operating state of the high frequency induction heating appliance, the second comparator 14 outputs a high signal enabling the drive controller 15 to turn on the NPN type bipolar transistor Q1.

Thereafter, the voltage generator 6 outputs a voltage corresponding to the detected current from the current transformer 5. As a result, the operational amplifier 8 amplifies a difference between the output signals from the output adjusting device 7 and the voltage generator 6. At this time, the first comparator 9 outputs a low signal when the output voltage from the voltage generator 6 applied to its inverting input terminal (−) is greater than the predetermined reference voltage applied to its non-inverting input terminal (+). The low signal from the first comparator 9 is applied as an enable signal to the integrator 10 and as a disable signal to the start signal generating circuit 11. As a result, the integrator 10 integrates the output signal from the operational amplifier 8 and feeds the integrated value through the diode D1 to the non-inverting input terminal (+) of the second comparator 14. In this connection, the integrated value is varied based on the output adjusting signal which is applied from the output adjusting device 7 to the non-inverting input terminal (+) of the operational amplifier 8 under the adjustment of the user.

The second comparator 14 compares the output signal from the integrator 10 with the output signal from the reference signal generator 13 and outputs a high or low signal to the drive controller 15 as a result of the comparison. In response to the high or low signal from the second comparator 14, the drive controller 15 turns on or off the NPN type bipolar transistor Q1.

When the NPN type bipolar transistor Q1 is turned on, the output signal from the smoothing circuit 3 is applied as the drive voltage to the working coil 4, thereby allowing the working coil 4 to generate the high frequency induction heating signal. The resonance condenser C3 is adapted to resonate the energy accumulated in the working coil 4 when the NPN type bipolar transistor Q1 is turned off, so as to lower the high DC voltage applied to the working coil 4.

However, the conventional high frequency induction heating appliance has a disadvantage, in that the operation thereof is started regardless of the waveform of the commercial AC power inputted therein. For this reason, there is quite a possibility that a load sensing circuit (not shown) which is connected to the AC power supply 1 together with the current transformer 51 may misjudge the amount of load such as a size of a container to be heated. Generally, when a large container is put on the working coil 4, the load amount (resistance) becomes large and the voltage from the AC power supply 1 thus becomes large. As a result, large current flows from the AC power supply 1, thereby causing the load sensing circuit to judge that a large container has been put on the working coil 4. On the contrary, when a small container is put on the working coil 4, the load amount becomes small and the voltage from the AC power supply 1 thus becomes small. As a result, small current flows from the AC power supply 1, thereby causing the load sensing circuit to judge that a small container has been put on the working coil 4. For example, when the peak value of the commercial AC power is applied as shown as a point P1 in FIG. 2 under the condition that the small container is put on the working coil 4 and the high frequency induction heating appliance is initially operated based on the generation of the start signal, the high frequency signal from the working coil 4 is directly generated and large current flows from the AC power supply 1. This causes the load sensing circuit to misjudge that a large container has been on the working coil 4. Alternatively, when the value of the commercial AC power applied is near the zero point as shown as a point P2 in FIG. 2 under the condition that a large container is put on the working coil 4 and the high frequency induction heating appliance is initially operated based on the generation of the start signal, the working coil 4 is not driven and no current flows from the AC power supply 1. This causes the load sensing circuit to misjudge that no container is put on the working coil 4. Further, when a value of the commercial AC power applied is near the zero point under the condition that the NPN type bipolar transistor Q1 is turned on based on the generation of the start signal without respect to the presence of the container on the working coil, the working coil 4 is not driven and the load sensing circuit cannot discriminate the presence of the container on the working coil 4.

SUMMARY OF INVENTION

Therefore, the present invention has been made in view of the above problem, and it is an object of the present invention to provide a high frequency induction heating appliance for applying a drive voltage to a working coil thereof at a point of time lapsed by a predetermined time period from a zero crossing point of a commercial AC power, so as to perform a stable start operation thereof.

In accordance with the present invention, the above object can be accomplished by a provision of a high frequency induction heating appliance comprising first rectifying means for rectifying a commercial AC power; a working coil being driven by an output signal from said first rectifying means to generate a high frequency induction heating signal; switching means responsive to a drive control signal thereto for switching the output signal from said first rectifying means being applied as a drive voltage to said working coil; low voltage transforming means for lowering a voltage of the commercial AC power to a desired voltage; second rectifying means for rectifying an output signal from said low voltage transforming means; input current detecting means for detecting current of the commercial AC power and generating a voltage corresponding to the detected current; output adjusting means for providing a signal for adjusting the output of the appliance under adjustment of the user; differential amplifying means for amplifying a difference between an output signal from said input current detecting means and an output signal from said output adjusting means; first comparing means for comparing the output signal from said input current detecting means with a predetermined reference voltage; integrating means being disabled or enabled by an output signal from said first comparing means to integrate an output signal from said differential amplifying means upon being enabled; start signal generating means being disabled or enabled in the opposite manner to said integrating means by the output signal from said first comparing means to generate a start signal for starting the operation of the appliance upon being enabled; zero crossing detecting means for detecting a zero crossing point from an output signal from said second rectifying means to generate a zero crossing detect signal; delay means for delaying the zero crossing detect signal from said zero crossing detecting means by a predetermined time period; AND logic operating means for AND logic-operating an output signal from said start signal generating means and an output signal from said delay mess; synchronizing signal generating means for generating a synchronizing signal corresponding to the driven state of said working coil based on turning-on/off of said switching means; reference signal generating means for generating a reference signal of desired waveform whenever the synchronizing signal is generated from said synchronizing signal generating means; second comparing means for comparing an output signal from said AND logic operating means with an output signal from said reference signal generating means or comparing an output signal from said integrating means with the output signal from said reference signal generating means; and drive control means for generating a drive control signal to control the turning-on/off of said switching means in response to an output signal from said second comparing means.

BRIEF DESCRIPTION OF THE DRAWINGS

The above and other objects, features and advantages of the present invention will be more clearly understood from the following detailed description taken in conjunction with the accompanying drawings, in which:

FIG. 4 is a detailed circuit diagram of a zero crossing detecting circuit in the appliance of FIG. 3 in accordance with an embodiment of the present invention;

FIG. 5 is a detailed circuit diagram of a delay circuit in the appliance of FIG. 3 in accordance with the embodiment of the present invention;

DETAILED DESCRIPTION OF THE PREFERRED EMBODIMENT

Figure 1:
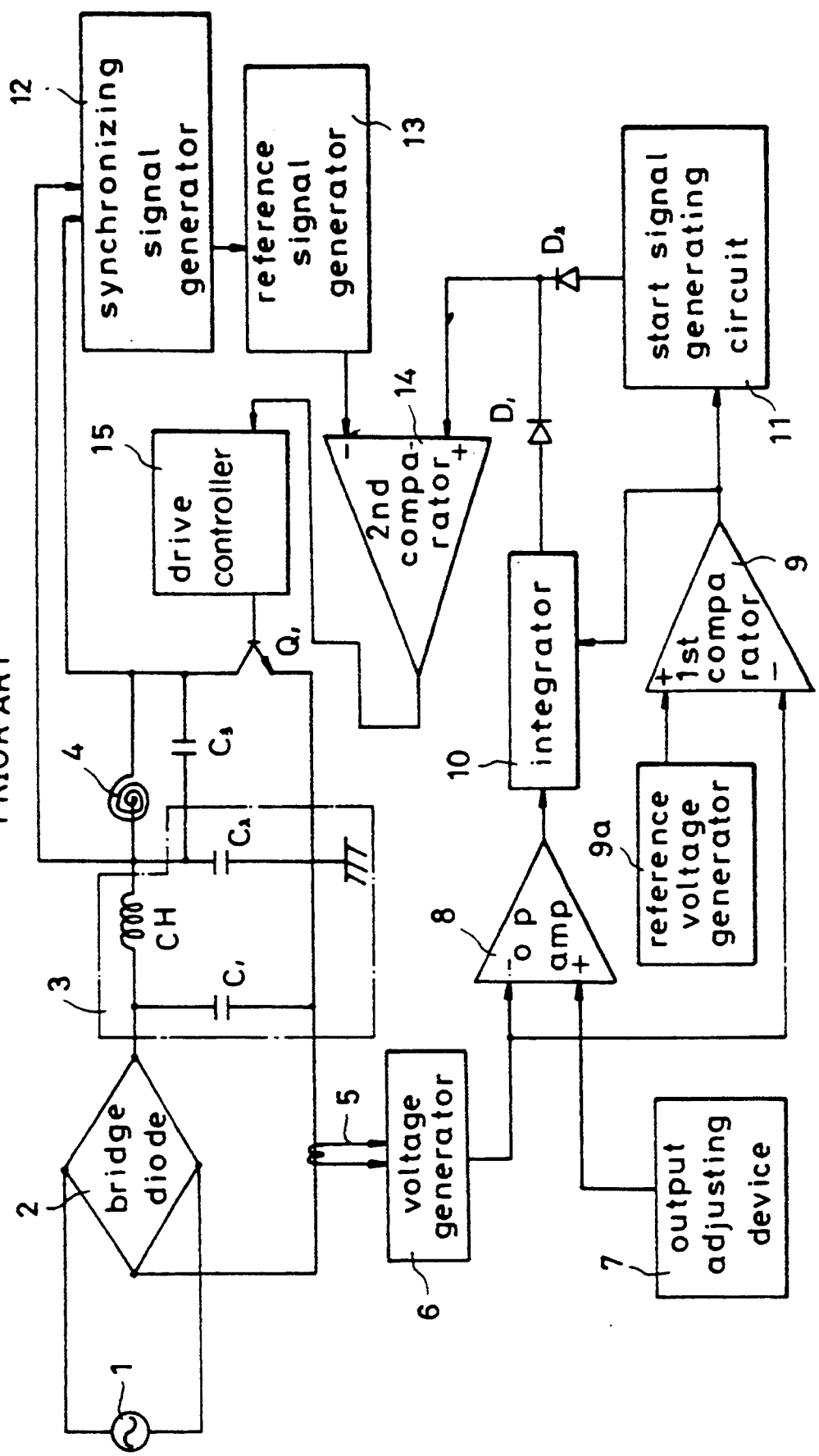
FIG. 1 is a block diagram of a conventional high frequency induction heating appliance.
Figure 2:
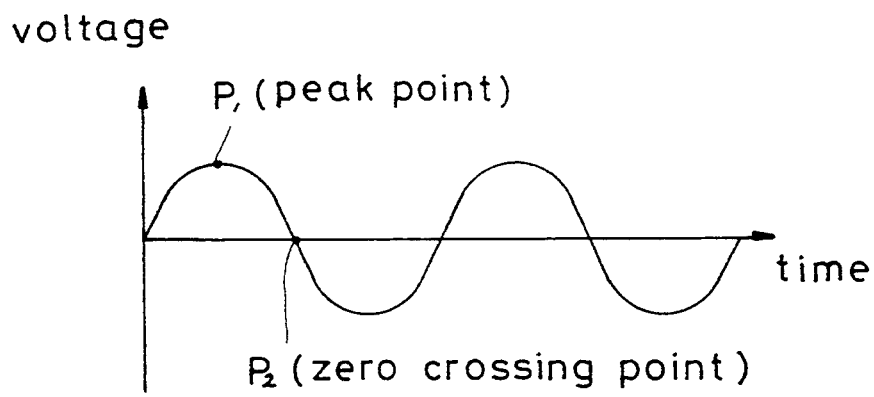
FIG. 2 is a waveform diagram of commercial AC power in which an initial input state of the AC power is illustrated.
Figure 3:
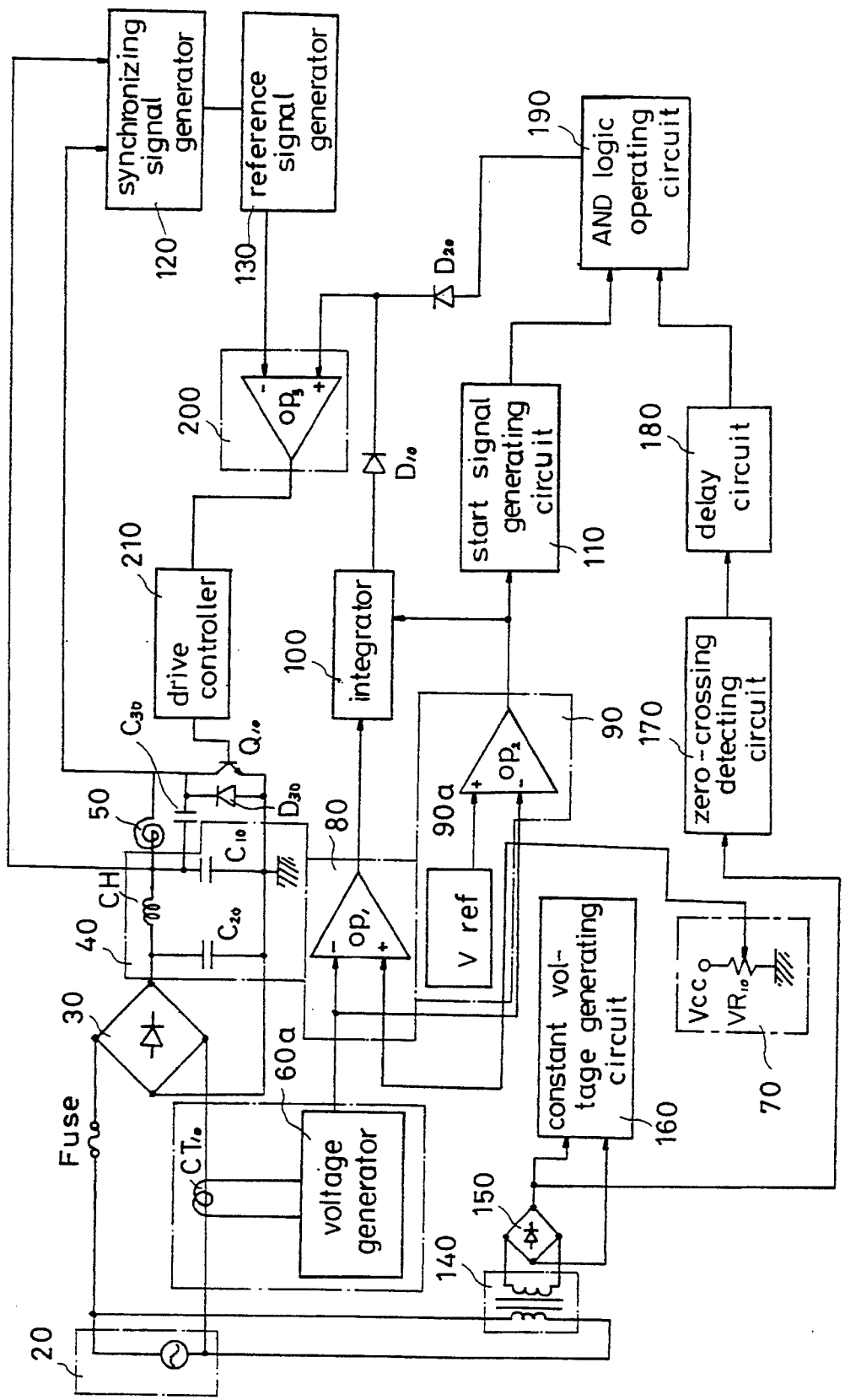
FIG. 3 is a block diagram of a high frequency induction heating appliance of the present invention.

Referring to FIG. 3, there is shown a block diagram of a high frequency induction heating appliance of the present invention. As shown in this figure, the high frequency induction heating appliance comprises an AC power supply 20, a first bridge diode 30 for full-wave rectifying a commercial AC power (for example, 110 V or 220 V) from the AC power supply 20, a smoothing circuit 40 for smoothing the full-wave rectified DC voltage from the first bridge diode 30, a working coil 50 being driven by the smoothed DC voltage from the smoothing circuit 40 being applied as a drive voltage thereto to generate a high frequency induction heating signal, a NPN type insulated gate bipolar transistor Q10 connected between the working coil 50 and the ground for switching the smoothed DC voltage from the smoothing circuit 40 being applied as the drive voltage to the working coil 50, an input current detector 60 connected to the AC power supply 20 for detecting current thereof and generating a voltage corresponding to the detected current, an output adjusting device 70 for providing a signal for adjusting output of the appliance under adjustment of the user, and a differential amplifier 80 for amplifying a difference between an output signal from the input current detector 60 and an output signal from the output adjusting device 70.

The high frequency induction heating appliance of the present invention also comprises a first comparator 90 for comparing the output signal from the input current detector 60 with a predetermined reference voltage Vref, an integrator 100 being disabled or enabled by an output signal from the first comparator 90 to integrate an output signal from the differential amplifier 80 upon being enabled, a start signal generating circuit 110 being disabled or enabled in the opposite manner to the integrator 100 by the output signal from the first comparator 90 to generate a start signal for starting the operation of the appliance upon being enabled, a diode D10 for blocking a minus voltage of an output signal from the integrator 100, a synchronizing signal generator 120 for generating a synchronizing signal corresponding to the driven state of the working coil 50, a reference signal generator 130 for generating a reference signal of desired waveform (for example, a saw tooth wave signal) whenever the synchronizing signal is generated from the synchronizing signal generator 120, a low voltage transformer 140 for lowering a voltage of the commercial AC power from the AC power supply 20 to a desired voltage, a second bridge diode 150 for full-wave rectifying an output voltage from the low voltage transformer 140, and a constant voltage generating circuit 160 for generating a constant DC voltage VCC1 based on an output voltage from the second bridge diode 150 and feeding the generated constant DC voltage (not illustrated) to respective components in the appliance.

The high frequency induction heating appliance of the present invention also comprises a zero crossing detecting circuit 170 for detecting a zero crossing point from the output voltage from the second bridge diode 150 to generate a zero crossing detect signal, a delay circuit 180 for delaying the zero crossing detect signal from the zero crossing detecting circuit 170 by a predetermined time period (about 1 μsec in the preferred embodiment of the present invention), an AND logic operating circuit 190 for AND logic-operating an output signal from the start signal generating circuit 110 and an output signal from the delay circuit 180, a diode D20 for blocking a minus voltage of an output signal from the AND logic operating circuit 190, a second comparator 200 for, at the initial state of the appliance, comparing the output signal from the AND logic operating circuit 190 through the second diode D20 with the reference signal of desired waveform from the reference signal generator 130 and, after the initial state of the appliance, comparing the output signal from the integrator 100 through the first diode D10 with the reference signal of desired waveform from the reference signal generator 130, to output a logic signal of desired level, and a drive controller 210 for controlling turning-on/off of the NPN type insulated gate bipolar transistor Q10 in response to an output signal from the second comparator 210.

In accordance with the preferred embodiment of the present invention, the commercial AC power from the AC power supply 20 is 110 V or 220 V.

The smoothing circuit 40 includes a choke coil CH, a first smoothing condenser C10 connected in parallel between one side of the choking Coil CH and the ground, and a second smoothing condenser C20 connected in parallel between the other side of the choking coil CH and the ground.

A resonance condenser C30 is connected between both sides of the working coil 50 for resonating energy accumulated in the working coil 50 when the NPN type insulated gate bipolar transistor Q10 is turned off, so as to lower the high DC voltage applied to the working coil 50 to a desired voltage.

A free wheeling diode D30 is connected between a collector and an emitter Of the NPN type insulated gate bipolar transistor Q10 for preventing generation of a reverse voltage therebetween.

The input current detector 60 is provided with a current transformer CT10 for detecting the current from the AC power supply 20 and a voltage generator 60a for generating the voltage corresponding to the detected current from the current transformer CT10.

The differential amplifier 80 includes a non-feedback operational amplifier OP1 having its inverting input terminal (−) for inputting the output signal from the input current detector 60 and its non-inverting input terminal (+) for inputting the output signal from the output adjusting device 70.

The output adjusting device 70 includes a DC voltage source Vcc (about 12 V in the preferred embodiment of the present invention) and a variable resistor VR10 connected between the DC voltage source Vcc and the ground.

The first comparator 90 includes a reference voltage generator 90a for generating the predetermined reference voltage Vref and an operational amplifier OP2 having its non-inverting input terminal (+) for inputting the predetermined reference voltage Vref from the reference voltage generator 90a and its inverting input terminal (−) for inputting the output signal from the input current detector 60.

The second comparator 200 includes an operational amplifier OP3 having its inverting input terminal (−) for inputting the reference signal of desired waveform from the reference signal generator 130 and its non-inverting input terminal (+) for inputting the output signal from the integrator 100 or the output signal from the AND logic operating circuit 190.

Although not shown, the reference voltage generator 90a is provided with a DC voltage source and two resistors for dividing a DC voltage from the DC voltage source.

Also, a bipolar junction transistor (BJT) or a MOSFET may be used instead of the NPN type insulated gate bipolar transistor Q10.

Referring to FIG. 4, there is shown a detailed circuit diagram of the zero crossing detecting circuit 170 in the appliance of FIG. 3 in accordance with an embodiment of the present invention. As shown in this figure, the zero crossing detecting circuit 170 includes first and second resistors R10 and R20 connected in series between output of the bridge diode 150 and the ground, a DC voltage (about 12 V) source Vcc, third and fourth resistors R30 and R40 connected in series between the DC voltage source Vcc and the ground, and an operational amplifier OP4 having its inverting input terminal (−) connected between the first and second resistors R10 and R20 and its non-inverting input terminal (+) connected between the third and fourth resistors R30 and R40.

Referring to FIG. 5, there is shown a detailed circuit diagram of the delay circuit 180 in the appliance of FIG. 3 in accordance with the embodiment of the present invention. As shown in this drawing, their delay circuit 180 includes a first resistor R50 having its one side connected to output of the zero crossing detecting circuit 170, a condenser C40 connected between the other side of the first resistor R50 and the ground, a DC voltage (about 12 V) source Vcc, second and third resistors R60 and R70 connected in series between the DC voltage source Vcc and the ground, an operational amplifier OP5 having its non-inverting input terminal (+) connected to junction of the first resistor R50 and the condenser C40 and its inverting input terminal (−) connected between the second and third resistors R60 and R70, and a diode D40 connected to output of the operational amplifier OP5 for blocking a minus voltage of an output signal from the operational amplifier OP5. In FIG. 5, the condenser C40 and the first resistor R50 may constitute an integrator.

Figure 6:
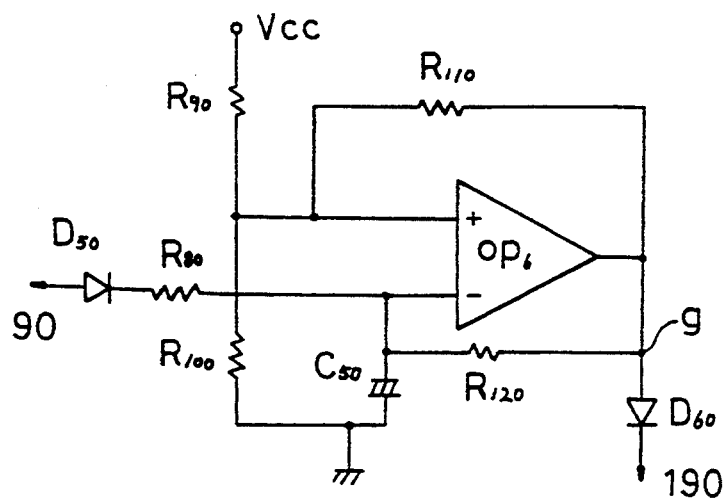
FIG. 6 is a detailed circuit diagram of a start signal generating circuit in the appliance of FIG. 3 in accordance with the embodiment of the present invention.

Referring to FIG. 6, there is shown a detailed circuit diagram of the start signal generating circuit 110 in the appliance of FIG. 3 in accordance with the embodiment of the present invention. As shown in this drawing, the start signal generating circuit 110 includes a DC voltage source Vcc, first and second resistors R90 and R100 connected in series between the DC voltage source Vcc and the ground, a diode D50 having its anode connected to output of the first comparator 90 for blocking a minus voltage of the output signal from the first comparator 90, an operational amplifier OP6 having its non-inverting input terminal (+) connected between the first and second resistors 90 and 100, a third resistor R50 connected between a cathode of the diode D50 and an inverting input terminal (−) of the operational amplifier OP6, a fourth resistor R110 connected between the non-inverting input terminal (+) and output of the operational amplifier OP6, a fifth resistor R120 connected between the inverting input terminal (−) and the output of the operational amplifier OP6, and a condenser C50 connected between the inverting input terminal (−) of the operational amplifier OP6 and the ground.

Figure 7:
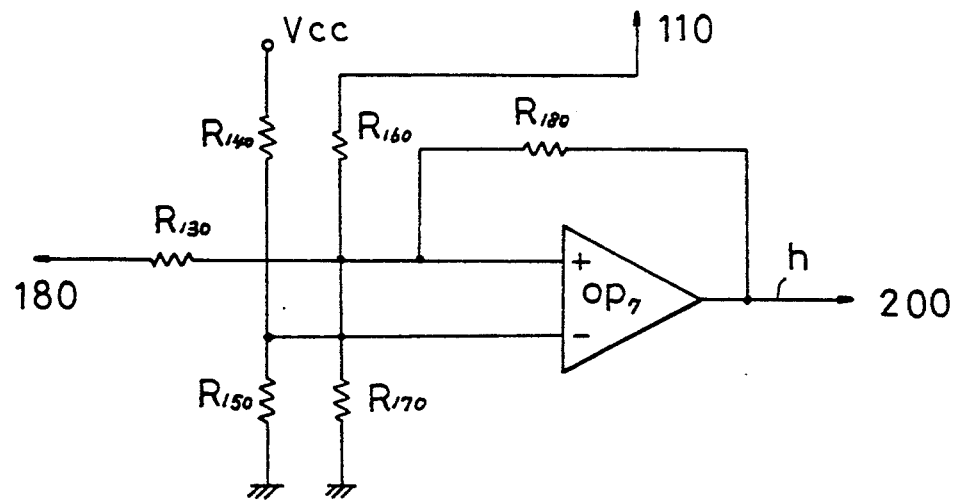
FIG. 7 is a detailed circuit diagram of an AND logic operating circuit in the appliance of FIG. 3 in accordance with the embodiment of the present invention.

Referring to FIG. 7, there is shown a detailed circuit diagram of the AND logic operating circuit 190 in the appliance of FIG. 3 in accordance with the embodiment of the present invention. As shown in the drawing, the AND logic operating circuit 190 includes a DC voltage source Vcc, first and second resistors R140 and R150 connected in series between the DC voltage source Vcc and the ground, third and fourth resistors R160 and R170 connected in series between output of the start signal generating circuit 110 and the ground, an operational amplifier OP7 having its non-inverting input terminal (+) contracted between the third and fourth resistors R160 and R170 and its inverting input terminal (−) connected between the first and second resistors R140 and R150, a fifth resistor R130 connected between output of the delay circuit 180 and the non-inverting input terminal (+) of the operational amplifier OP7, and a hysteresis resistor R180 connected between the non-inverting input terminal (+) and output of the operational amplifier OP7.

Figure 8:
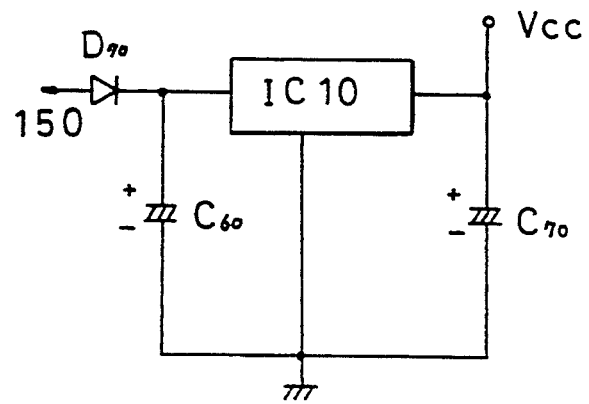
FIG. 8 is a detailed circuit diagram of a constant voltage generating circuit in the appliance of FIG. 3 in accordance with the embodiment of the present invention.

Referring to FIG. 8, there is shown a detailed circuit diagram of the constant voltage generating circuit 160 in the appliance of FIG. 3 in accordance with the embodiment of the present invention. As shown in this figure, the constant voltage generating circuit 160 includes a diode D70 having its anode connected to output of the second bridge diode 150 for blocking a minus voltage of the output signal from the second bridge diode 150, a smoothing condenser C60 connected between a cathode of the diode D70 and the ground, a voltage stabilizing regulator IC10 connected to the cathode of the diode D70, and a condenser C70 connected between output of the regulator IC10 and the ground.

The operation of the high frequency induction heating appliance with the above-mentioned construction in accordance with the present invention will hereinafter be described in detail with reference to FIGS. 9A to 9F which are timing diagrams of signals from respective components in the appliance of FIG. 3.

First, the high frequency induction heating appliance is applied with the commercial AC power (110 V/220

V) and the output adjusting device 70 therein generates the desired output adjusting signal under the adjustment of the user. Since the current inputted at the input current detector 60 through the current transformer $CT_{10}$ therein is zero at the initial state in which the power is applied to the appliance, the operational amplifier OP1 in the differential amplifier 80 amplifies only the output adjusting signal from the output adjusting device 70. At the same time, the first comparator 90 outputs a high signal because its inverting input terminal is applied with the zero voltage from the input current detector 60 and its non-inverting input is supplied by reference voltage generator 90a. The high signal from the first comparator 90 is applied as an enable signal to the start signal generating circuit 110 and as a disable signal to the integrator 100.

On the other hand, the first bridge diode 30 full-wave rectifies the commercial AC power from the AC power supply 20 and the smoothing circuit to smooths the full-wave rectified DC voltage from the first bridge diode 30, The smoothed DC voltage from the smoothing circuit 40 is applied as the drive voltage to the working coil 50 when the NPN type insulated gate bipolar transistor Q10 is turned on.

Also, the commercial AC power voltage from the AC power supply 20 is lowered to a desired voltage through the low voltage transformer 140 and then full-wave rectified through the second bridge diode 150. The DC voltage outputted from the second bridge diode 150 is divided by the resistors R10 and R20 in the zero crossing detecting circuit 170 and then applied to the inverting input terminal (−) of the operational amplifier OP4 therein, as shown in FIG. 4.

In the zero crossing detecting circuit 170, the DC voltage of about 12 V from the DC voltage source Vcc is divided by the resistors R30 and R40 and then applied as a reference voltage to the non-inverting input terminal (+) of the operational amplifier OP4. The operational amplifier OP4 compares the two signals inputted therein with each other and outputs the zero crossing detect signal, as a result of the comparison, to the delay circuit 180 as shown FIG. 5.

In the delay circuit 180, the zero crossing detect signal outputted from the zero crossing detecting circuit 170 is integrated by the resistor R50 and the condenser C40 and the integrated value is applied to the non-inverting input terminal (+) of the operational amplifier OP5. Also, the DC voltage of about 12 V from the DC voltage source Vcc is divided by the resistors R60 and R70 and then applied as a reference voltage to the inverting input terminal (−) of the operational amplifier OP5. The operational amplifier OP5 compares the two signals inputted therein with each other and outputs the zero crossing detect signal delayed by a predetermined time period (about 1 μsec in the preferred embodiment of the present invention) as a result of the comparison. At this time, the diode D40 acts to block a minus voltage of the output signal from the operational amplifier OP5.

On the other hand, if the enable signal (for example, high signal) is applied to the start signal generating circuit 110 at the initial state of the high frequency induction heating appliance, the applied high signal is also applied to the inverting input terminal (−) of the operational amplifier OP6 through the minus voltage blocking diode D50 and the resistor R80, in the start signal generating circuit 110, as shown in FIG. 6. Also in the start signal generating circuit 110, the DC voltage of about 12 V from the DC voltage source Vcc is divided by the resistors R90 and R100 and then applied as a reference voltage to the non-inverting input terminal (+) of the operational amplifier OP6. The operational amplifier OP6 compares the two signals inputted therein with each other. At this time, the operational amplifier OP6 oscillates through the feedback resistors R110 and R120, thereby to output repeatedly and periodically high and low signals, which are in turn applied as the start signal through the minus voltage blocking diode D60 to the AND logic operating circuit 190.

In the AND logic operating circuit 190, as shown in FIG. 7, the start signal divided by the resistors R160 and R170 and the output signal from the delay circuit 180 inputted through the resistor R130 are added and applied to the non-inverting input terminal (+) of the operational amplifier OP7. Also, the DC voltage of about 12 V from the DC voltage source Vcc is divided by the resistors R140 and R150 and then applied as a reference voltage to the inverting input terminal (−) of the operational amplifier OP7. The operational amplifier OP7 compares the two signals inputted therein and outputs a logic signal of desired level as a result of the comparison. The logic signal from the operational amplifier OP7 is applied through the minus voltage blocking diode D20 to the operational amplifier OP3 in the second comparator 200 in FIG. 3. Noticeably, in the AND logic operating circuit 190, the added signal of the output signals from the delay circuit 180 and the start signal generating circuit 110 is greater than the reference voltage only when the output signals are all high. As a result, only in this case does the AND logic operating circuit 190 output a high signal.

Namely, the AND logic operating circuit 190 outputs the high signal at a point of time lapsed by about 1 μsec from the zero crossing point of the commercial AC power, at the generation of the start signal.

At the initial state Of the high frequency induction heating appliance, the integrator 100 is disabled by the high signal from the first comparator 90. As a result, the integrator 100 outputs no signal through the minus voltage blocking diode D10.

After the initial state of the appliance, if the output signal from the input current detector 60 is greater than the predetermined reference voltage Vref from the reference voltage generator 90a, the first comparator 90 outputs a low signal making the start signal generating circuit 110 disable and the integrator 100 enable. As a result, the output signal from the integrator 100 is applied through the diode D10 to the non-inverting input terminal (+) of the operational amplifier OP3.

On the other hand, the synchronizing signal generator 120 generates the synchronizing signal corresponding to the driven state of the working coil 50 based on the turning-on/off of the NPN type insulated gate bipolar transistor Q10. The reference signal generator 130 generates the saw tooth wave signal as the reference signal whenever the synchronizing signal is generated from the synchronizing signal generator 120. The reference signal from the reference signal generator 130 is applied to the inverting input terminal of the operational amplifier OP3.

The operational amplifier OP3 compares the two signals inputted therein with each other and outputs a logic signal as a result of the comparison to the drive control let 210. In response to the logic signal from the operational amplifier OP3, the drive controller 210 turns on or off the NPN type insulated gate bipoler transistor Q10. When the NPN type insulated gate bipolar transistor Q10 is turned on, the output signal from the smoothing circuit 40 is applied as the drive voltage to the working coil 50, thereby allowing the working coil 50 to generate the high frequency induction heating signal. The resonance condenser C30 is adapted to resonate the energy accumulated in the working coil 50 when the NPN type insulated gate bipolar transistor Q10 is turned off, so as to lower the high DC voltage applied to the coil 50.

In the constant voltage generating circuit 160, as shown in FIG. 8, the diode D70 blocks the minus voltage of the output signal from the ;second bridge diode 150 and the condenser C60 smooths the output signal from the diode D70. The regulator IC10 acts to stabilize the smoothed DC voltage from the condenser C60 and charge it on the condenser C70, which feeds the charged voltage as the DO voltage Vcc to the respective components in the appliance.

Figure 9A:
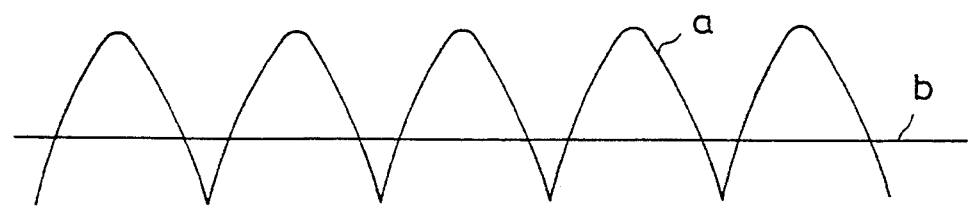
FIGS. 9A to 9F are timing diagrams of signals from respective components in the appliance of FIG. 3.
Figure 9B:
Figure 9C:
Figure 9D:
Figure 9E:
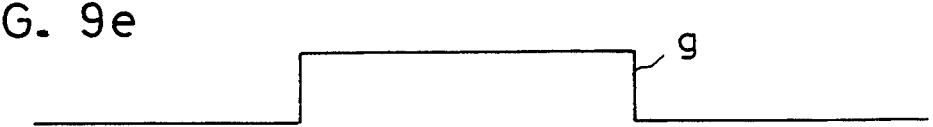
Figure 9F:

Referring to FIGS. 9a to 9f, there are shown timing diagrams of the signals from the respective components in the appliance of FIG. 3. FIG. 9a shows the voltage at a point a in FIG. 4 into which the output signal from the second bridge diode 150 is divided by the resistors R10 and R20 and the reference voltage at a point b in FIG. 4 which is generated by the DC voltage source Vcc and the resistors R30 and R40. FIG. 9b shows the zero crossing detect signal at a point c in FIG. 4. FIG. 9c shows the signal at a point d in FIG. 5 into which the zero crossing detect signal is integrated by the resistor R50 and the condenser C40 and the reference voltage at a point e in FIG. 5 which is generated by the DC voltage source Vcc and the resistors R60 and R70. FIG. 9d shows the zero crossing detect signal output at a point f in FIG. 5 which is delayed by the predetermined time period. FIG. 9e shows the start signal at a point g in FIG. 6 which oscillates periodically. Finally, FIG. 9f shows the signal at a point h in FIG. 7 which is outputted at the state that the start signal is synchronized with the output signal from the delay circuit 180.

As hereinbefore described, according to the present invention, the drive voltage is applied to the working coil at the point of time that the start signal is generated and the zero crossing detect signal is delayed by the predetermined time period. This has the effect of preventing the working coil from being abruptly driven or being incapable of driving, that the working coil can be driven stably. Also in the input of the appliance for the commercial AC power, there is generated the current in proportion to the load amount such as the size of the container to)be heated. Therefore, a separate load sensing circuit (not shown) can sense the load amount accurately by detecting the magnitude of the current.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A high frequency induction heating appliance comprising:
    first rectifying means for rectifying commercial AC power;
    working coil means, selectively driven by said first rectifying means, for generating a high frequency induction heating signal;
    switching means, responsive to a drive control signal applied thereto, for selectively coupling said first rectifying means to said working coil;
    low voltage transforming means for lowering a voltage of the commercial AC power to a desired voltage;
    second rectifying means for rectifying an output signal from said low voltage transforming means;
    input current detecting means for detecting current of the commercial AC power and generating a voltage corresponding to the detected current;
    output adjusting means for providing a signal for adjusting the output of the appliance under adjustment of a user;
    differential amplifying means for amplifying a detected difference between an output signal from said input current detecting means and an output signal from said output adjusting means;
    first comparing means for comparing the output signal from said input current detecting means with a predetermined reference voltage;
    integrating means, which is disabled or enabled by an output signal from said first comparing means for integrating an output signal from said differential amplifying means upon being enabled;
    start signal generating means, which is disabled or enabled in the opposite manner from said integrating means by the output signal from said first comparing means, for generating a start signal for starting the operation of the appliance upon being enabled;
    zero crossing detecting means for detecting a zero crossing point from an output signal from said second rectifying means to generate a zero crossing detect signal;
    delay means for delaying the zero crossing detect signal from said zero crossing detecting means by a predetermined time period;
    AND logic operating means for AND logic-operating an output signal from said start signal generating means and an output signal from said delay means;
    synchronizing signal corresponding to the driven state of said working coil means based on turning-on/off of said switching means;
    reference signal generating means for generating a reference signal of desired waveform whenever the synchronizing signal is generated from said synchronizing signal generating means;
    second comparing means for comparing an output signal from said AND logic operating means with an output signal from said reference signal generating means or comparing an output signal from said integrating means with the output signal from said reference signal generating means; and
    drive control means for generating the drive control signal to control turning-on/off of said switching means in response to an output signal from said second comparing means.

2. A high frequency induction heating appliance as set forth in claim 1, further comprising:
    a resonance condenser connected between both sides of said working coil for resonating energy accumulated in said working coil when said switching means is turned off, so as to lower the voltage applied to said working coil.

3. A high frequency induction heating appliance as set forth in claim 1 further comprising:

a free wheeling diode, connected in circuit with said switching means, for preventing generation of a reverse voltage.

4. A high frequency induction heating appliance as set forth in claim 1, further comprising:
constant voltage generating means for obtaining a stabilized DC voltage from the output signal from said second rectifying means, charging the obtained DC voltage and feeding the charged DC voltage to respective components in the appliance.

5. A high frequency induction heating appliance as set forth in claim 4, wherein said constant voltage generating means includes;
diode means for blocking a negative voltage of the output signal from said second rectifying means;
smoothing condenser means for smoothing an output signal from said diode means;
regulator means for stabilizing an output signal from said smoothing condenser means; and
condenser means for charging an output signal from said regulator means for feeding to other components in the appliance.

6. A high frequency induction heating appliance as set forth in claim 1, wherein said output adjusting means includes:
a DC voltage source; and
a variable resistor connected between said DC voltage source and ground for varying a level of a voltage from said DC voltage source under the adjustment of the user.

7. A high frequency induction heating appliance as set forth in claim 1, wherein said switching means may be an insulated gate bipolar transistor (IGBT), a bipolar junction transistor (BJT) or a MOSFET.

8. A high frequency induction heating appliance as set forth in claim 1, wherein said differential amplifying means includes:
a non-feedback operational amplifier having two inputs of opposite polarity with one input thereof coupled to,the output signal from said input current detecting means and its other input coupled to the output signal from said output adjusting means.

9. A high frequency induction heating appliance as set forth in claim 1, wherein said first comparing means includes:
a reference voltage generator for generating the predetermined reference voltage; and
an operational amplifier having its non-inverting input terminal (+) coupled to the predetermined reference voltage from said reference voltage generator and its inverting input terminal (−) coupled to the output signal from said input current detecting means.

10. A high frequency induction heating appliance as set forth in claim 9, wherein said reference voltage generator includes:
a DC voltage source; and
two resistors connected in series to said DC voltage source and ground for dividing a voltage from said DC voltage source.

11. A high frequency induction heating appliance as set forth in claim 1, wherein said second comparing means includes:
an operational amplifier having its inverting input terminal (−) coupled to the output signal from said reference signal generating means and its non-inverting input terminal (+) coupled to the output signal from said integrating means or the output signal from said AND logic operating means.

12. A high frequency induction heating appliance as set forth in claim 1, further comprising:
diodes connected to outputs of said integrating means and said AND logic operating means for bloc;king minus voltages of the output signals from said integrating means and said AND logic operating means, respectively.

13. A high frequency induction heating appliance as set forth in claim 1, further comprising:
smoothing means connected between said first rectifying means and said working coil for smoothing the output signal from said first rectifying means.

14. A high frequency induction heating appliance as set forth in claim 13, wherein said smoothing means includes:
a choke coil connected between said first rectifying means and said working coil;
a first smoothing condenser connected in parallel between one side of said choke coil and ground; and
a second smoothing condenser connected in parallel between the other side of said choking coil and ground.

15. A high frequency induction heating appliance as set forth in claim 1, wherein said input current detecting means includes:
a current transformer for detecting the current from the commercial AC power; and
a voltage generator for generating the voltage corresponding to the detected current from said current transformer.

16. A high frequency induction heating appliance as set forth in claim 1, wherein said first and second rectifying means are full-wave rectifying bridge diodes, respectively.

17. A high frequency induction heating appliance as set forth in claim 1, wherein said zero crossing detecting means includes:
first and second resisters connected in series between the output of said second rectifying means and ground;
a DC voltage source;
third and fourth resisters connected in series between said DC voltage source and ground; and
an operational amplifier having its inverting input terminal (−) connected between said first and second resisters and its non-inverting input terminal (+) connected between said third and fourth resisters.

18. A high frequency induction heating appliance as set forth in claim 1, wherein said delay means includes:
a first resistor having) its one side connected to the output of said zero crossing detecting means;
a condenser connected between the other side of said first resistor and ground;
a DC voltage source;
second and third resisters connected in series between said DC voltage source and ground;
an operational amplifier having its non-inverting input terminal (+) connected to the junction of said first resistor and said condenser and its inverting input terminal (−) connected between said second and third resistors; and
a diode connected to the output of said operational amplifier for blocking a minus voltage of an output signal from said operational amplifier.

19. A high frequency induction heating appliance as set forth in claim 1, wherein said start signal generating means includes:
- a DC voltage source;
- first and second resistors connected in series between said DC voltage source and ground;
- a diode having its anode connected to the output of said first comparing means, for blocking a minus voltage of the output signal from said first comparing means;
- an operational amplifier having its non-inverting input terminal (+) connected between said first and second resistors;
- a third resistor connected between a cathode of said diode and an inverting input terminal (−) of said operational amplifier;
- a fourth resistor connected between the non-inverting input terminal (+) and the output of said operational amplifier;
- a fifth resistor connected between the inverting input terminal (−) and the output of said operational amplifier; and
- a condenser connected between the inverting input terminal (−) of said operational amplifier and ground.

20. A high frequency induction heating appliance as set forth in claim 1, wherein said AND logic operating means includes:
- a DC voltage source;
- first and second resistors connected in series between said DC voltage source and ground;
- third and fourth resistors connected in series between the output of said start signal generating means and ground;
- an operational amplifier having its non-inverting input terminal (+) connected between said third and fourth resistors and its inverting input terminal (−) connected between said first and second resistors;
- a fifth resistor connected between the output of said delay means and the non-inverting input terminal (+) of said operational amplifier; and
- a hysteresis resistor connected between the non-inverting input terminal (+) and the output of said operational amplifier.

21. A high frequency induction heating appliance as set forth in claim 1, where in the zero crossing detect signal is delayed by about 1 μsec by said delay means.

* * * * *